(12) United States Patent
Inoue (10) Patent No.: US 11,003,063 B2
(45) Date of Patent: May 11, 2021

(54) HEAT GENERATING DEVICE, LIGHT SOURCE UNIT, AND PROJECTOR

(71) Applicant: CASIO COMPUTER CO., LTD., Tokyo (JP)

(72) Inventor: Kiyohiko Inoue, Sagamihara (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 16/717,626

(22) Filed: Dec. 17, 2019

(65) Prior Publication Data
US 2020/0192202 A1 Jun. 18, 2020

(30) Foreign Application Priority Data

Dec. 18, 2018 (JP) .............................. JP2018-236361

(51) Int. Cl.
| | |
|---|---|
| *G03B 21/16* | (2006.01) |
| *F21V 29/83* | (2015.01) |
| *F21V 29/50* | (2015.01) |
| *G03B 21/20* | (2006.01) |
| *F21V 29/503* | (2015.01) |

(52) U.S. Cl.
CPC ............ *G03B 21/16* (2013.01); *F21V 29/503* (2015.01); *F21V 29/83* (2015.01); *G03B 21/204* (2013.01)

(58) Field of Classification Search
None
See application file for complete search history.

(56) References Cited

U.S. PATENT DOCUMENTS

2013/0341531 A1* 12/2013 Bonham .................. F26B 3/28
250/492.1

FOREIGN PATENT DOCUMENTS

| JP | 2000-284701 A | 10/2000 |
|---|---|---|
| JP | 2017-219747 A | 12/2017 |

OTHER PUBLICATIONS

JPO; Application No. 2018-236361; Notification of Reasons for Refusal dated Dec. 3, 2020.
JPO; Application No. 2018-236361; Notice of Reasons for Refusal dated Feb. 25, 2021.

* cited by examiner

*Primary Examiner* — Michelle M Iacoletti
*Assistant Examiner* — Danell L Owens
(74) *Attorney, Agent, or Firm* — Fitch, Even, Tabin & Flannery LLP (57) ABSTRACT

A heat generating device includes a heat generating portion, a first cover configured to cover at least part of the heat generating portion and including a first opening portion formed on one side and a second opening portion formed on the other side lying opposite to the one side, and a second cover disposed on an outer side of the first cover and forming a flow path leading from the first opening portion to the second opening portion, and in the heat generating device, a height from a lower end of the first cover to an opening center of the first opening portion is greater than a height from the lower end of the first cover to an opening center of the second opening portion.

17 Claims, 8 Drawing Sheets

HEAT GENERATING DEVICE, LIGHT SOURCE UNIT, AND PROJECTOR

CROSS-REFERENCE TO RELATED APPLICATION

This patent application is based upon and claims the benefit of priority under 35 USC 119 of Japanese Patent Application No. 2018-236361 filed on Dec. 18, 2018, the entire disclosure of which, including the description, claims, drawings, and abstract, is incorporated herein by reference in its entirety.

BACKGROUND OF THE INVENTION

Field of the Invention

The present invention relates to a heat generating device, a light source unit, and a projector.

Description of the Related Art

Japanese Patent Laid-Open No. 2017-219747 discloses a projector including an excitation light shining device including blue laser diodes and an optical wheel device configured to be excited by excitation light from the excitation light shining device to thereby emit luminescent light. In the optical device, one part is installed within a case, while the other part is covered by a wheel cover provided on an upper surface of the case. A straightening heat dissipating plate configured to cool an optical wheel is provided on an inner side of the wheel cover.

The dustproofness of the optical wheel device can be enhanced by covering the part of the optical wheel device with the wheel cover. However, the temperature tends to be easily increased on the periphery of the optical wheel in which a luminescent light emitting area that is excited by excitation light constitutes a heat generating portion, and there have often been situations where the temperature of the relevant portion is increased further as a result of the part of the optical wheel device being closed tightly. Consequently, in the wheel cover that is disclosed by Japanese Patent Laid-Open No. 2017-219747, although a flow of air is produced on a front side of the optical wheel, there have often been situations where the optical wheel is not cooled sufficiently.

SUMMARY OF THE INVENTION

The present invention has been made in view of the situations described above, and an object of the present invention is to provide a heat generating device including a cover that can improve the cooling efficiency of a heat generating portion, a light source unit including the heat generating device, and a projector including the light source unit.

According to an aspect of the present invention, there is provided a heat generating device including a heat generating portion, a first cover configured to cover at least part of the heat generating portion and including a first opening portion formed on one side and a second opening portion formed on the other side lying opposite to the one side, and a second cover disposed on an outer side of the first cover and forming a flow path leading from the first opening portion to the second opening portion, and in the heat generating device, a height from a lower end of the first cover to an opening center of the first opening portion is greater than a height from the lower end of the first cover to an opening center of the second opening portion.

According to another aspect of the present invention, there is provided a light source unit including the heat generating device described above, an excitation light shining device configured to emit light in a first wavelength range, and a semiconductor light emitting device configured to emit light in a second wavelength range that differs from the light in the first wavelength range, and in the light source unit, the heat generating portion includes a wheel motor and an optical wheel configured to be rotated by the wheel motor and including a luminescent light emitting area laid out on the optical wheel to emit light in a third wavelength range that differs from the light in the first wavelength range and the light in the second wavelength range.

According to a further aspect of the present invention, there is provided a projector including the light source unit described above, a display device onto which light emitted from the light source unit is shined to form image light, a projection optical system configured to project the image light formed by the display device onto a screen, and a control unit configured to control the display device and the light source unit.

DETAILED DESCRIPTION OF THE PREFERRED EMBODIMENTS

Figure 1:
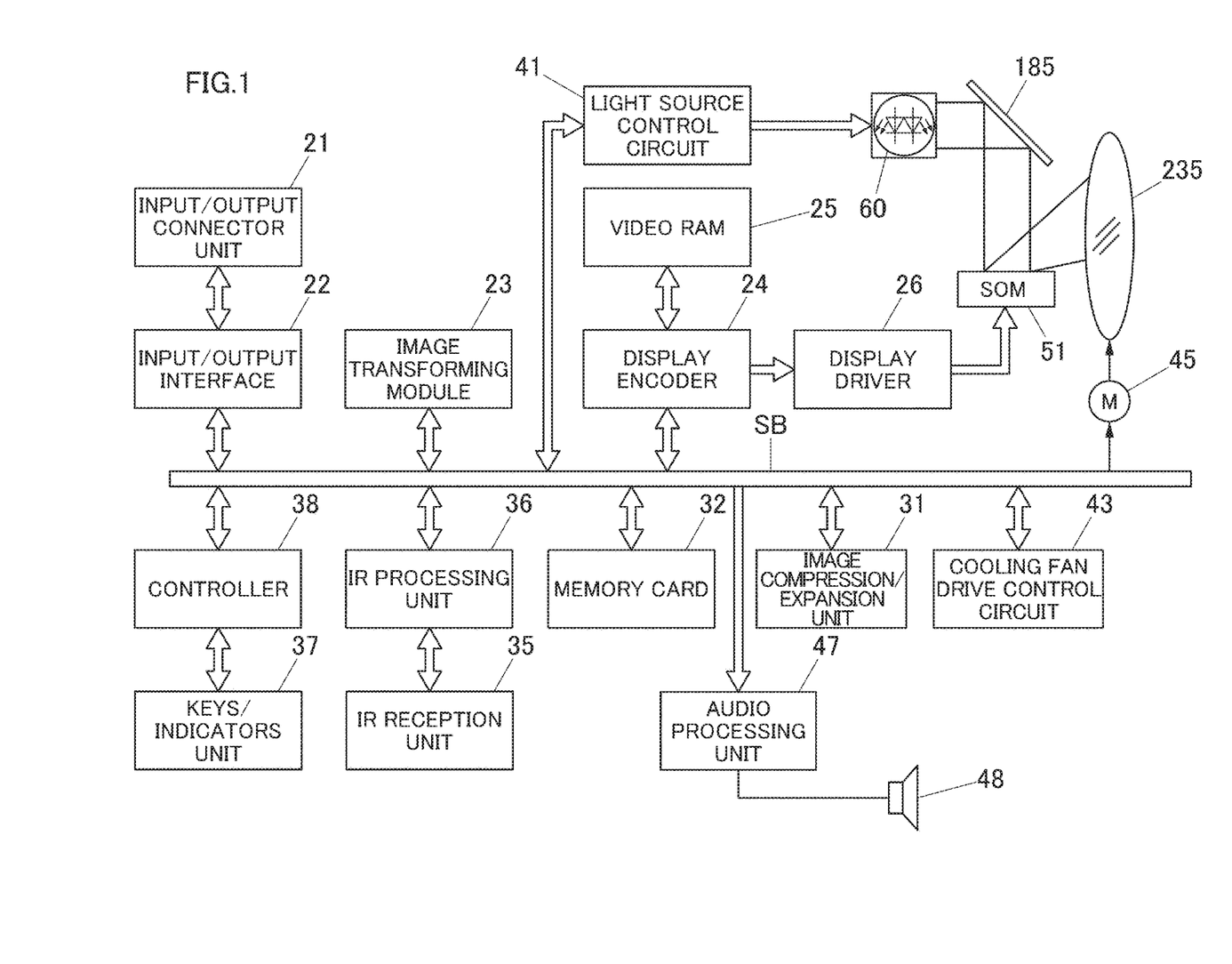
FIG. 1 is a block diagram illustrating functional blocks of a projector according to an embodiment of the present invention.

Hereinafter, an embodiment of the present invention will be described based on drawings. FIG. 1 is a block diagram illustrating functional blocks of a projector control unit (a control unit) of a projector 10. The projector control unit includes a controller 38, an input/output interface 22, an image transforming module 23, a display encoder 24, a display driver 26, and the like.

The controller 38 governs the control of operations of individual circuitries inside the projector 10 and includes CPU, ROM storing fixedly operation programs such as various settings, RAM that is used as a work memory, and the like.

The controller 38 causes image signals of various standards which are inputted from an input/output connector unit 21 to be sent, via the input/output interface 22 and a system bus (SB), to the image transforming module 23, where the image signals are transformed so as to be unified into an image signal of a predetermined format which is suitable for display. Thereafter, the unified image signal to the display encoder 24.

The display encoder 24 deploys the inputted image signal on a video RAM 25 for storage in it and generates a video signal from the contents stored in the video RAM 25, outputting the video signal so generated to the display driver 26.

The display driver 26 functions as a display device controller and drives a display device 51, which is a spatial optical modulator (SOM), at an appropriate frame rate in accordance with the image signal outputted from the display encoder 24.

Then, in the projector 10, a pencil of light emitted from a light source unit 60 is shined on to the display device 51 by way of an optical system to thereby form an optical image by light reflected from the display device 51, and the image so formed is then projected onto a screen, not illustrated, for display by way of a projection optical system. A movable lens group 235 of the projection optical system is driven by a lens motor 45 for zooming and focusing.

An image compression/expansion unit 31 performs a recording process in which a luminance signal and a color difference signal of an image signal are data compressed through processing of Adaptive Discrete Cosine Transform (ADCT) and Huffman coding, and the compressed data is sequentially written on a memory card 32, which constitutes a detachable recording medium.

Further, with the projector 10 set in a reproducing mode, the image compression/expansion unit 31 reads out the image data recorded in the memory card 32 and expands the individual image data that makes up a series of dynamic images frame by frame. Then, the image compression/expansion unit 31 outputs the image data to the display encoder 24 by way of the image transforming module 23 and enables the display of dynamic images based on the image data stored in the memory card 32.

Operation signals from a keys/indicators unit 37 including main keys and indicators which are provided on an upper panel of a casing of the projector 10 are sent out directly to the controller 38. Key operation signals from a remote controller are received by an IR reception unit 35 and are then demodulated into a code signal at an Ir processing unit 36 for output to the controller 38.

The controller 38 is connected with an audio processing unit 47 by way of a system bus (SB). This audio processing unit 47 includes a circuitry for a sound source such as a PCM sound source. With the projector 10 set in a projection mode and the reproducing mode, the audio processing unit 47 converts audio data into analog signals and drives a speaker 48 to output loudly sound or voice based on the audio data.

The controller 38 controls a light source control circuit 41, which functions as a light source control unit. The light source control circuit 41 controls individually emission of light from a red light source device, a green light source device, and a blue light source device of the light source unit 60 so that light beams in predetermined wavelength ranges required for forming an image are emitted from the light source unit 60.

Further, the controller 38 causes a cooling fan drive control circuit 43 to detect temperatures with a plurality of temperature sensors which are provided in the light source unit 60 so as to control revolution speeds of cooling fans based on the results of the temperature detections. Additionally, the controller 38 also causes the cooling fan drive control circuit 43 to keep the cooling fans revolving by use of a timer or the like even after a power supply to a main body of the projector 10 is switched off. Alternatively, the controller 38 causes the cooling fan drive control circuit 43 to cut off the power supply to the main body of the projector 10 depending upon the results of the temperature detections by the temperature sensors.

Figure 2:
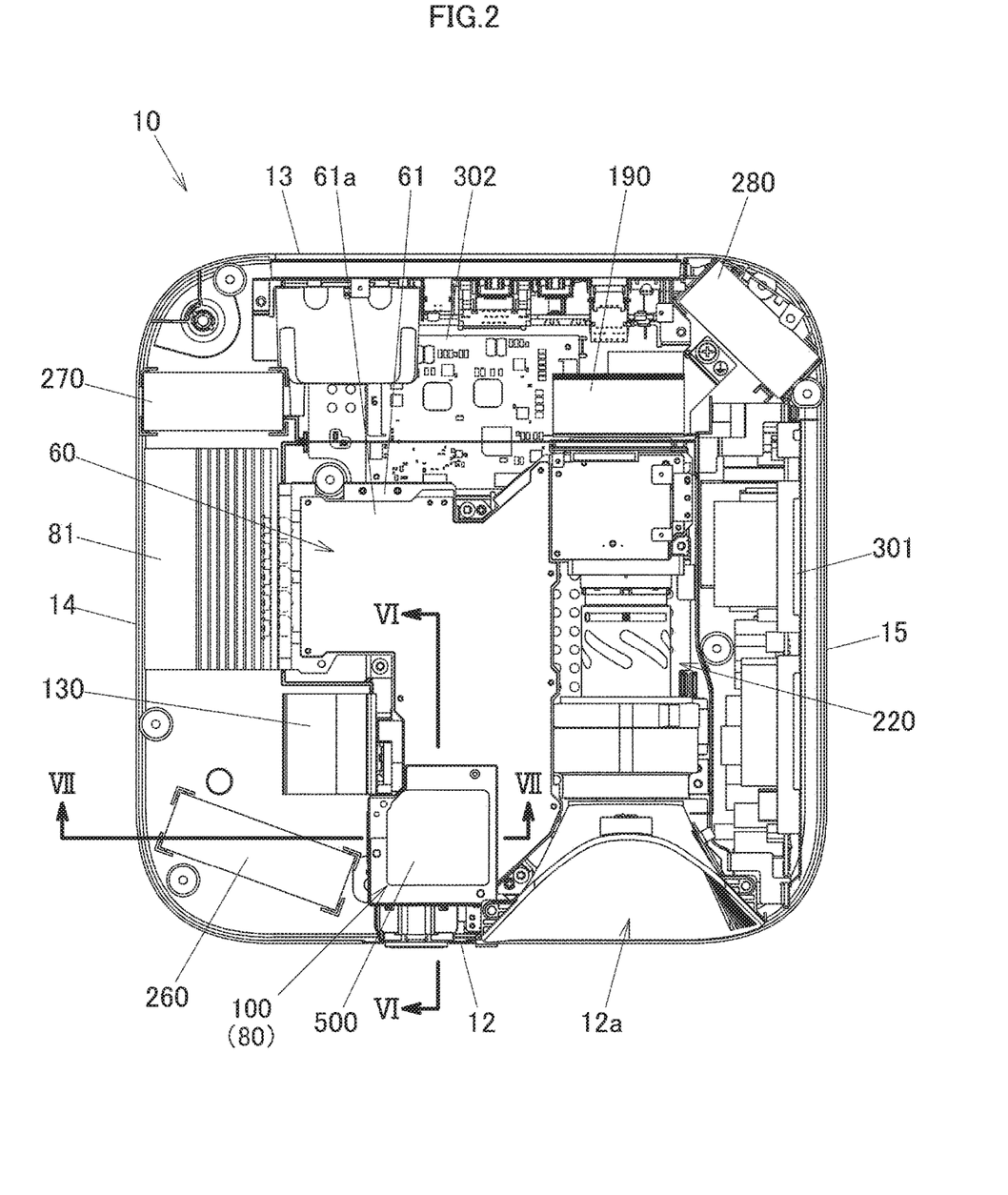
FIG. 2 is a schematic plan view illustrating an internal structure of the projector according to the embodiment of the present invention.
Figure 3:
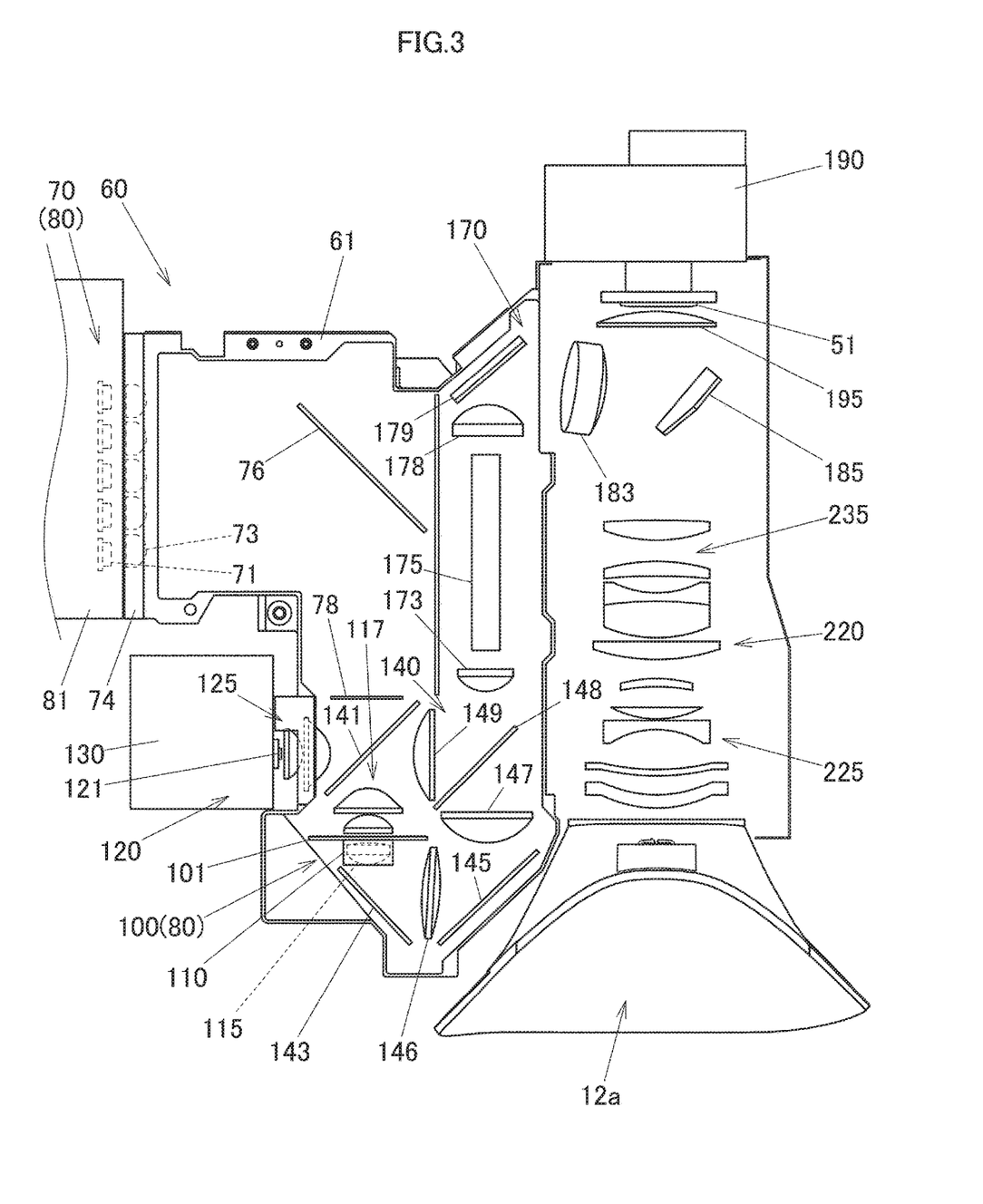
FIG. 3 is a schematic plan view of an interior of an optical case of a light source unit according to the embodiment of the present invention.

Next, an internal structure of the projector 10 will be described based on FIGS. 2 and 3. FIG. 2 is a schematic plan view illustrating the internal structure of the projector 10. Here, a casing of the projector 10 is formed substantially into a box-like configuration and includes an upper surface and a lower surface, a front panel 12, a rear panel 13, a right panel 14, and a left panel 15. It should be noted that in the following description, when left and right are referred to in relation to the projector 10, they denote, respectively, left and right directions with respect to a projecting direction of the projector 10. When front and rear are referred to in relation to the projector 10, they denote, respectively, front and rear directions with respect to a direction from the projector 10 towards a screen and a traveling direction of a pencil of light emitted from a light emitting portion 12a.

The projector 10 includes a power supply device 301, a control circuit board 302, and the light source unit 60. Additionally, the projector 10 includes an air inlet fan 260, an air inlet fan 270, and an air outlet fan 280 as cooling fans.

The light source unit 60 is disposed substantially at a center of the casing of the projector 10. The light source unit 60 includes an optical case 61. The optical case 61 is opened at an upper portion, and a cover 61a is attached to the optical case 61. Optical members including the red, green, and blue light source devices, lenses, mirrors, and the like are installed in an interior of the optical case 61. The power supply device 301 is disposed substantially parallel to the left panel 15. A substrate of the power supply device 301 is disposed substantially parallel to the left panel 15. The control circuit board 302 is disposed on a side of the light source unit 60 that faces the rear panel 13. The control circuit board 302 is disposed substantially at right angles to an up-down direction. The control circuit board 302 includes a power supply circuit block, a light source control block, and the like. Additionally, a plurality of control circuit boards 302 can be provided individually for the corresponding functions such as the power supply circuit block, the light source control block, and the like.

Here, an internal structure of the light source unit 60 will be described. FIG. 3 is a schematic plan view of the light source unit 60 with the cover 61a of the case 61 omitted from illustration. The light source unit 60 includes a red light source device 120 (a semiconductor light emitting device) that constitutes a light source of light of a wavelength range in the red wavelength range or, simply, light in the red wavelength range (light in a second wavelength range), a green light source device 80 that constitutes a light source of light of a wavelength in the green wavelength range or, simply, light in the green wavelength range, and an excitation light shining device 70 that constitutes not only a blue light source device constituting a light source of light of a wavelength in the blue wavelength range or, simply, light in the blue wavelength range (light in a first wavelength range) but also an excitation light source. The green light source device 80 is made up of the excitation light shining device 70 and an optical wheel device 100 (a heat generating device). The light source unit 60 includes a light guiding optical system 140. The light guiding optical system 140 combines a pencil of light in the green wavelength range, a pencil of light in the blue wavelength range, and a pencil of light in the red wavelength range together so as to guide the pencils of green, blue, and red light onto the same optical path.

The excitation light shining device 70 is disposed on a side of the casing of the projector 10 that faces the right panel 14. The excitation light shining device 70 includes a plurality of semiconductor light emitting elements that are disposed in such a manner that optical axes of the semiconductor light emitting elements become parallel to the rear panel 13. In this embodiment, the semiconductor light emitting elements are made up of a plurality of blue laser diodes 71 configured to emit light in the blue wavelength range. The plurality of blue laser diodes 71 are disposed parallel to the right panel 14. These blue laser diodes 71 are fixed to a holder 74.

The excitation light shining device 70 includes a reflection mirror 76, a diffuse plate 78, and a heat sink 81. The reflection mirror 76 turns axes of light beams emitted individually from the blue laser diodes 71 through substantially 90 degrees towards the diffuse plate 78. The diffuse plate 78 spreads the light beams emitted from the blue laser diodes 71 and reflected by the reflection mirror 76 at a predetermined diffuse angle. The heat sink 81 is disposed between the blue laser diodes 71 and the right panel 14.

Collimator lenses 73 are disposed individually on optical paths of light beams from the blue laser diodes 71, and the collimator lenses 73 convert light beams emitted from the blue laser diodes 71 into parallel light to enhance the directivity of the light beams so emitted. These collimator lenses 73 are held to the holder 74 together with the blue laser diodes 71.

The red light source device 120 includes a red light source 121 that is disposed in such a manner as to be parallel to axes of pencils of light of the blue laser diodes 71 and a collective lens group 125 configured to collect light emitted from the red light source 121. This red light source device 121 is a red light emitting diode that is a semiconductor light emitting device that emits light in the red wavelength range. The red light source device 120 is disposed in such a manner that an axis of light in the red wavelength range emitted from the red light source device 120 intersects an axis of light in the green wavelength range emitted from an optical wheel 101 that is formed as a luminescent plate. Additionally, the red light source device 120 includes a heat sink 130 on a side of the red light source 121 that faces the right panel 14.

The optical wheel device 100 (the heat generating device), which makes up the green light source device 80, includes the heat generating portion including the optical wheel 101 and the wheel motor 110, an incident side collective lens group 117, and an emerging side collective lens 115. The optical wheel 101 is a luminescent wheel that is disposed in such a manner as to be at right angles to an axis of light emitted from the excitation light shining device 70. This luminescent wheel 101 is driven to rotate by the wheel motor 110. The collective lens group 117 collects pencils of excitation light emitted from the excitation shining device 70 onto the optical wheel 101. The collective lens 115 collects a pencil of light emitted from the optical wheel 101 in the direction of the front panel 12. The optical wheel device 100 is disposed above the collective lens group 117 and the collective lens 115. As a result, a lower portion of the optical wheel 101 is partially disposed on optical paths of the collective lens group 117 and the collective lens 115.

A luminescent light emitting area and a diffuse transmission area are provided end to end in a circumferential direction on the optical wheel 101. The luminescent light emitting area, which is laid out on the optical wheel 101, receives light in the blue wavelength range emitted from the blue laser diodes 71 as excitation light to thereby emit luminescent light in the green wavelength range that is excited by the excitation light so received. The diffuse transmission area diffuse transmits light emitted from the blue laser diodes 71. The light that is diffuse transmitted through the diffuse transmission area is emitted as light in the blue wavelength range of the light source device 60.

In the optical wheel device 100, portions of the optical wheel 101 and the wheel motor 110 are installed within the optical case 61, and the other portions are exposed from an opening portion 61b (refer to FIGS. 4 and 5) in the cover 61a of the optical case 61 to avoid an interference of the cover 61a with the optical wheel 101 and the like and are covered by a wheel cover 500 (refer to FIG. 2).

The wheel cover 500, configured to cover part of the optical wheel 101 of the optical wheel device 100, has a double-wall structure, whereby not only can noise be quietened due to the Helmholtz theory, but also the optical wheel 101 and the like can be cooled by a flow of air produced in an interior of the wheel cover 500. The wheel cover 500 will be described in detail later.

The light guiding optical system 140 includes a first dichroic mirror 141, a collective lens 149, a second dichroic mirror 148, a first reflection mirror 143, a collective lens 146, a second reflection mirror 145, and a collective lens 147. The first dichroic mirror 141 is disposed in a position where light in the blue wavelength range emitted from the excitation light shining device 70, light in the green wavelength range emitted from the optical wheel 101, and light in the red wavelength range emitted from the red light source device 120 intersect. The first dichroic mirror 141 transmits light in the blue wavelength range and light in the red wavelength range and reflects light in the green wavelength range. An axis of light in the green wavelength range that is reflected by the first dichroic mirror 141 is turned through 90 degrees in the direction of the left panel 15 towards the collective lens 149. Consequently, an axis of light in the red wavelength range that is transmitted through the first dichroic mirror 141 coincides with the axis of the light in the green wavelength range that is reflected by the first dichroic mirror 141.

The collective lens 149 is disposed on a side of the first dichroic mirror 141 that faces the left panel 15. Light in the red wavelength range that is transmitted through the first dichroic mirror 141 and light in the green wavelength range that is reflected by the first dichroic mirror 141 are both incident on the collective lens 149. The second dichroic mirror 148 is disposed on a side of the collective lens 149 that faces the left panel 15 and on a side of the collective lens 147 that faces the rear panel 13. The second dichroic mirror 148 reflects light in the red wavelength range and light in the green wavelength range and transmits light in the blue wavelength range. Thus, light in the red wavelength range and light in the green wavelength range that are collected by the collective lens 49 are reflected by the second dichroic mirror 148 in such a manner as that the axes of the red light and the green light are turned through 90 degrees towards the rear panel 13. The collective lens 173 is disposed on a side of the second dichroic mirror 148 that faces the rear panel 13. Light in the red wavelength range and light in the green wavelength range that are reflected by the second dichroic mirror 148 are incident on the collective lens 173.

The first reflection mirror 143 is disposed on an axis of light in the blue wavelength range transmitted through the optical wheel 101, that is, between the collective lens 115 and the front panel 12. The first reflection mirror 143 reflects light in the blue wavelength range to turn an axis of the light in the blue wavelength range through 90 degrees in the direction of the left panel 15. The collective lens 146 is disposed on a side of the first reflection mirror 143 that faces the left panel 15. In addition, the second reflection mirror 145 is disposed on a side of the collective lens 146 that faces the left panel 15. The second reflection mirror 145 turns the axis of the light in the blue wavelength range that is reflected by the first reflection mirror 143 and is collected by the collective lens 146 through 90 degrees towards the rear panel 13. The collective lens 147 is disposed on a side of the second reflection mirror 145 that faces the rear panel 13. The light in the blue wavelength range that is reflected by the second reflection mirror 145 passes through the second dichroic mirror 148 by way of the collective lens 147 and is then incident on the collective lens 173. In this way, pencils of light in the red wavelength range, light in the green wavelength range, and light in the blue wavelength range that are guided by the light guiding optical system 140 are guided onto the same optical path of a light source optical system 170.

The light source optical system 170 includes the collective lens 173, a light tunnel 175, a collective lens 178, a light axis turning mirror 179, a collective lens 183, a shining mirror 185, and a condenser lens 195. Since the condenser lens 195 emits image light emitted from the display device 51 that is disposed on a side of the condenser lens 195 that faces the rear panel 13 towards a projection optical system 220, the condenser lens 195 also constitutes part of the projection optical system 220.

The pencils of red light, green light, and blue light that emerge from the collective lens 173 are incident on the light tunnel 175. When entering the light tunnel 175, the pencils of red light, green light, and blue light are converted into a pencil of light whose intensity is distributed more uniformly by the light tunnel 175.

The light axis turning mirror 179 is disposed on an optical axis of the light tunnel 175 at an end facing the rear panel 13 via the collective lens 178. The pencil of light that emerges from an emerging port of the light tunnel 175 is collected by the collective lens 178, whereafter an axis of the pencil of light is turned towards the collective lens 183.

The pencil of light that is reflected by the light axis turning mirror 179 is collected by the collective lens 183, whereafter the pencil of light is shined on to the display device 51 at a predetermined angle by way of the condenser lens 195 by the shining mirror 185. A heat sink 190 is provided on a side of the display device 51 that faces the rear panel 13. The display device 51, which is a digital micromirror device (DMD), is cooled by this heat sink 190.

The pencil of light, which is light source light shined on to an image forming plane of the display device 51 by the light source optical system 170, is reflected by the image forming plane of the display device 51 and is then projected on to a screen by way of the projection optical system 220 as projected light.

The projection optical system 220 is made up of the condenser lens 195, the movable lens group 235, and a fixed lens group 225. The fixed lens group 225 is installed in a fixed lens barrel. The movable lens group 235 is incorporated in a movable lens barrel to thereby be moved manually or automatically for zooming or focusing.

With the projector 10 configured in the way that has been described heretofore, when the optical wheel 101 is rotated, and light is emitted from the excitation light shining device 70 and the red light source device 120 at different timings, light in the red wavelength range, light in the green wavelength range and light in the blue wavelength range are incident on the light tunnel 175 byway of the light guiding optical system 140. Thus, the DMD, which is the display device 51 of the projector 10, display red, green, and blue light in a time-sharing fashion in accordance with data, whereby a color image can be projected on to the screen.

Figure 4:
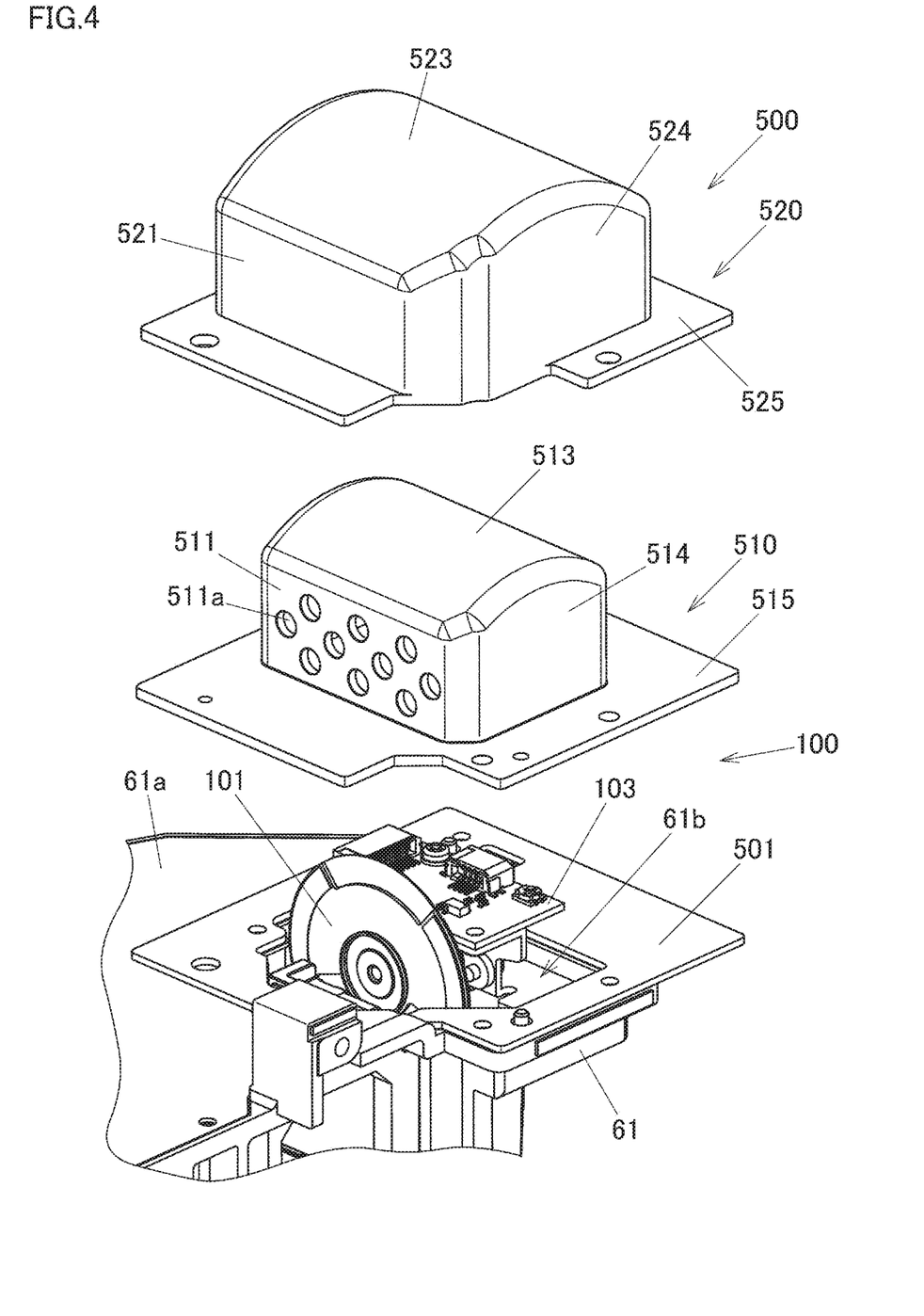
FIG. 4 is an exploded perspective view illustrating a periphery of an optical wheel device according to the embodiment of the present invention with only a wheel cover exploded as seen from an optical wheel side.
Figure 5:
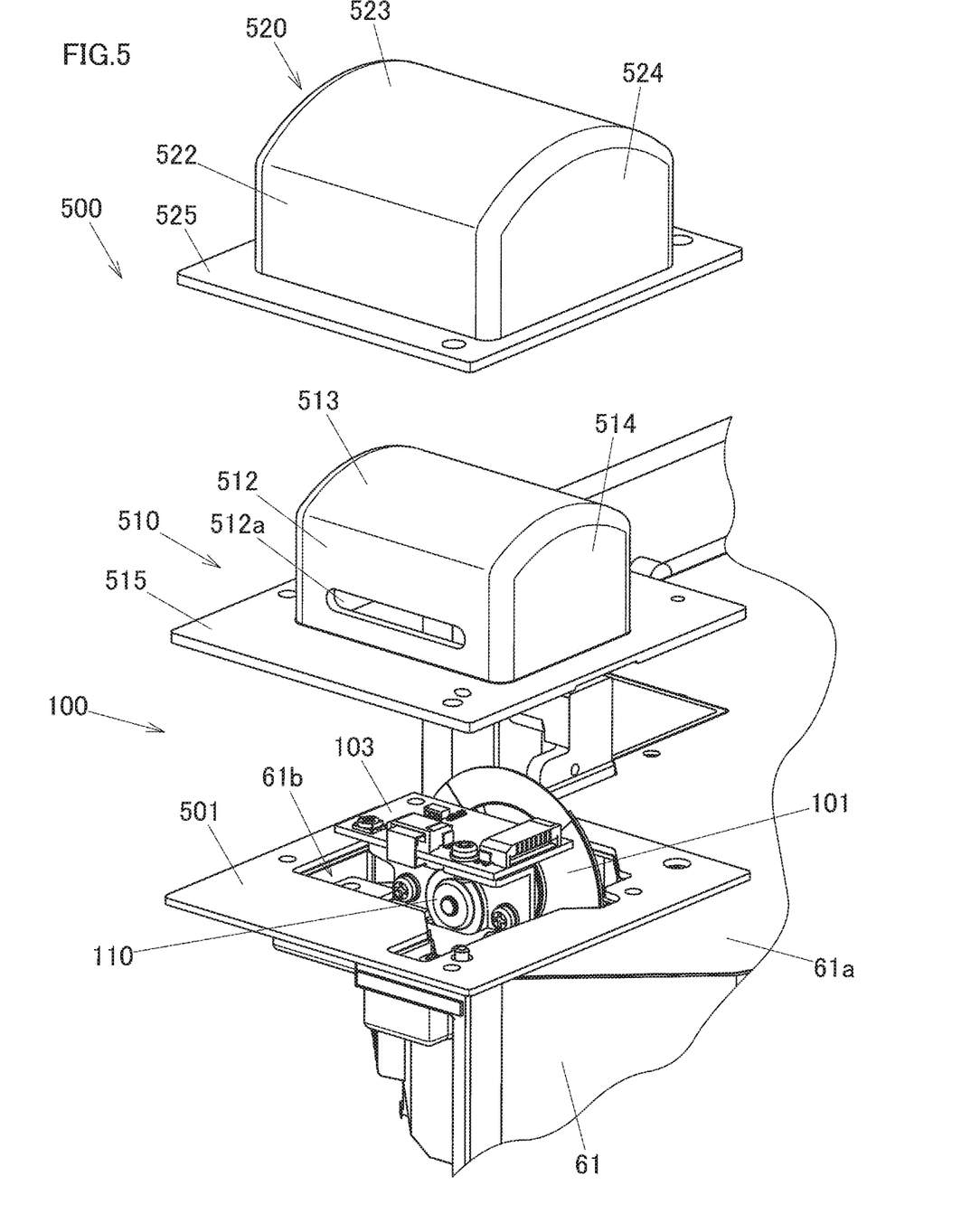
FIG. 5 is an exploded perspective view illustrating the periphery of the optical wheel device according to the embodiment of the present invention with only the wheel cover exploded as seen from a wheel motor side.
Figure 6:
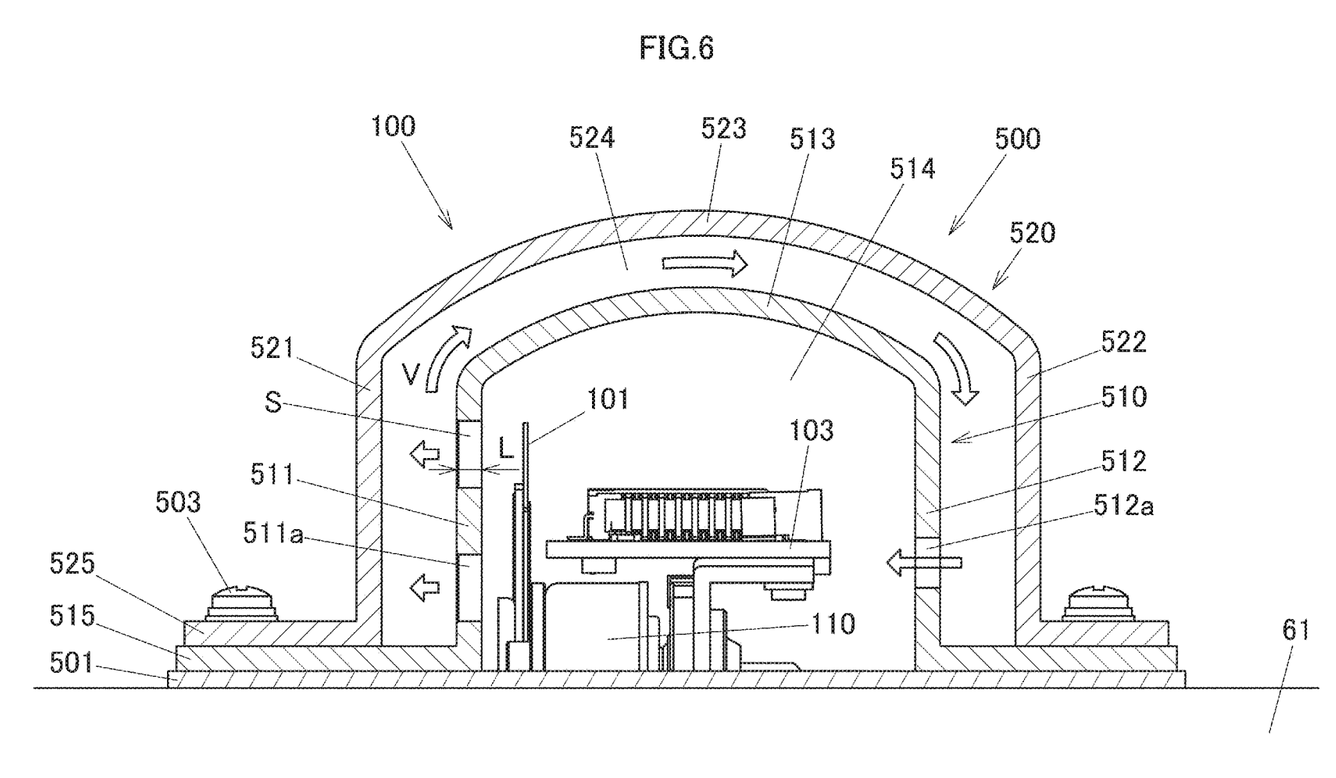
FIG. 6 is a cross-sectional view taken along a line VI-VI in FIG. 2 with only the wheel cover illustrated in section.
Figure 7:
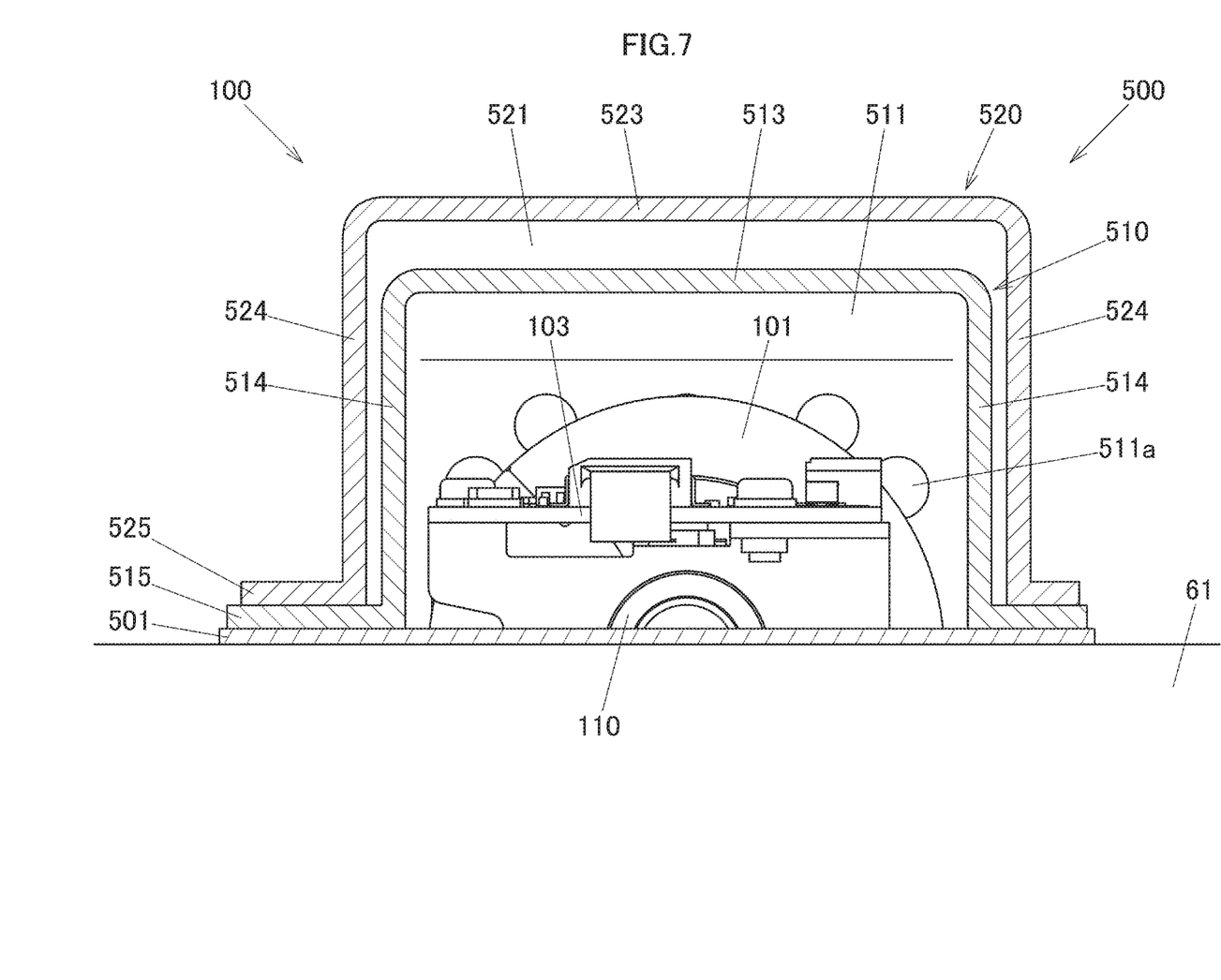
FIG. 7 is a cross-sectional view taken along a line VII-VII in FIG. 2 with only the wheel cover illustrated in section.

Next, the wheel cover 500 will be described in detail based on FIGS. 4 to 7. FIGS. 4 and 5 are perspective views showing the optical wheel device 100 and the wheel motor 110 partially in an enlarged fashion with the wheel cover 500 shown as exploded. A circuit board 103 is shown as being provided together with the optical wheel 101 and the wheel motor 110 on the optical wheel device 100 shown in FIGS. 4, 5. Specifically, the circuit board 103 is mounted above the wheel motor 110 and includes a control circuit board configured to control the revolution of the wheel motor 110. FIG. 4 is the perspective view as seen from the side of the optical wheel 101, and FIG. 5 is the perspective view as seen from the side of the wheel motor 110. FIGS. 6 and 7 are a cross-sectional view taken along a line VI-VI and a cross-sectional view taken along a line VII-VII in FIG. 2, respectively with the wheel cover 500 mounted on the optical case 61.

The wheel cover 500 includes an inner cover 510 (a first cover) and an outer cover 520 (a second cover). The outer cover 520 is formed on an outer side of the inner cover with a predetermined space defined between the inner cover 510 and itself.

The inner cover 510 has a substantially rectangular parallelepiped box shape, and an upper surface of the inner cover 510 has a convex arc-like shape as seen from an end (in a vertical section). The inner cover 510 includes an inner cover front plate 511 (a first front plate) that is erected at a side facing the optical wheel 101 and an inner cover rear plate 512 (a first rear plate) that is erected at a side facing the wheel motor 110. Multiple through holes 511a are formed in the inner cover front plate 511. In this embodiment, as shown in FIG. 4, multiple through holes 511a are disposed in three rows in a zigzag fashion. Three through holes 511a are formed laterally in each of an upper row and a lower row, and four through holes 511a are formed laterally in a middle row.

A laterally long elongated hole 512a is formed on the inner cover rear plate 512 (the first rear plate) of the inner cover 510 at a slightly lower portion of the inner cover rear plate 512. Here, a total area of the multiple through holes 511a is substantially equal to an area of the elongated hole 512a. An inner cover upper plate 513 (a first upper plate) is formed on the inner cover 510, and this inner cover upper plate 513 connects upper ends of the inner cover front plate 511 and the inner cover rear plate 512 together. The inner cover upper plate 513 is formed into an outwardly convex arc-like shape as seen from an end (in a vertical section). Left and right ends of the inner cover front plate 511 and left and right ends of the inner cover rear plate 512 are connected together by two inner cover end plates 514 (first side plates). Upper ends of the inner cover end plates 514 are connected to left and right ends of the inner cover upper plate 513. A flange portion 515 is formed on a periphery of an edge portion of the inner cover 510 that is opened downwards for the inner cover 510 to be attached to the optical case 61.

On the other hand, the outer cover 520 has an external shape such as a substantially rectangular parallelepiped box shape which is substantially similar to that of the inner cover 510, and similar to the inner cover 510, an upper surface of the outer cover 520 has a convex arc-like shape as seen from an end (in a vertical section). The outer cover 520 includes an outer cover front plate 521 (a second front plate) that is erected opposite to the inner cover front plate 511 of the inner cover 510 with a predetermined gap defined therebetween and an outer cover rear plate 522 (a second rear plate) that is similarly erected opposite to the inner cover rear plate 512 with a predetermined gap defined therebetween. In addition, an outer cover upper plate 523 is formed on the outer cover 520, and this outer cover upper plate 523 lies opposite to the inner cover upper plate 513 of the inner cover 510 with a predetermined gap defined therebetween and connects upper ends of the outer cover front plate 521 and the outer cover rear plate 522 together. The outer cover upper plate 523 (a second upper plate) is formed into an outwardly convex arc-like shape as seen from an end (in a vertical section).

On the outer cover 520, two outer cover end plates 524 (second side plates) are formed closely opposite to the inner cover end plates 514 of the inner cover 510. The two outer cover end plates 524 connect left and right ends of the outer cover front plate 521 and left and right ends of the outer cover rear plate 522 and are connected to the outer cover upper plate 523 at upper ends thereof. A flange portion 525 is formed on a periphery of an edge portion of the outer cover 520 that is opened downwards for the outer cover 520 to be attached to the optical case 61.

As shown in FIGS. 6 and 7, the inner cover 510 and the outer cover 520 are fastened together and attached to the optical case 61 via a rubber sheet 501 with bolts 503. At this time, a predetermined gap is defined between outer surfaces of the inner cover front plate 511, the inner cover rear plate 512, and the inner cover upper plate 513 of the inner cover 510 and inner surfaces of the outer cover front plate 521, the outer cover rear plate 522, and the outer cover upper plate 523 of the outer cover 520. In addition, as shown in FIG. 7, a gap defined between an outer surface of the inner cover end plate 514 of the inner cover 510 and an inner surface of the outer cover endplate 524 is made into such a small gap that the outer cover 520 can be placed over the inner cover 510.

An interior of the wheel cover 500 is formed in such a manner that the Helmholtz theory can be applied. Revolving noise of the optical wheel 101 constitutes a noise source of suction target noise. Noise generated at the noise source enters the multiple through holes 511a from the optical wheel 101 lying inside the inner cover 510 and vibrates air within the multiple through holes 511a. At this time, for the wheel cover 500, an expression that is represented by the following expression is established for Helmholtz noise absorbing equipment. Here, as described above, since the outer surface of the inner cover endplate 514 lies close to the inner surface of the outer end plate 524, a behind-hole space (V) is formed by a predetermined space that is defined between the outer surfaces of the inner cover front plate 511, the inner cover rear plate 512, and the inner cover upper plate 513 of the inner cover 510 and the inner surfaces of the outer cover front plate 521, the outer cover rear plate 522, and the outer cover upper plate 523 of the outer cover 520.

[Expression 1]

$$f_0 = \frac{c}{2\pi}\sqrt{\frac{S}{V \cdot L}} \ [Hz] \quad (1)$$

where,
$f_0$: resonance frequency [Hz];
c: sound velocity [m/s];
S: hole cross-sectional area [m$^2$] (total area of multiple through holes 511a);
V: volume of behind-hole space [m$^3$];
L: hole depth [m] (thickness of inner cover front plate 511 of inner cover 510).

Thus, when the projector 10 (the light source unit 60) is driven, and the optical wheel device 100 is driven, the optical wheel 101 is rotated by the wheel motor 110, whereby rotational noise (wind noise) of the optical wheel 101 is generated. This rotational noise is absorbed by vibration of air in the multiple through holes 511a that are defined by the thickness of the inner cover front plate 511. The hole sectional area (S) and the volume (V) of the behind-hole space should be controlled as required so that the absorption of the rotational noise is carried out for sound areas around 2000 Hz which a human being can hear best.

Further, a flow of air is generated in a predetermined space (the behind-hole space) between the inner cover 510 and the outer cover 520 by vibration of air in the multiple through holes 511a that are defined by the thickness of the inner cover front plate 511. That is, continuous vibration of air in the multiple through holes 511a that are defined by the thickness of the inner cover front plate 511 pushes out air on the peripheries of the through holes 511a. Then, as indicted by white arrows fringed with black solid lines, air emerging from the multiple through holes 511a flows along the inner surface of the outer cover 520 and the outer surface of the inner cover 510 from the space defined between the inner cover front plate 511 and the outer cover front plate 521 through the space defined between the inner cover upper plate 513 and the outer cover upper plate 523 to the space defined between the inner cover rear plate 512 and the outer cover rear plate 522 and then flows into the inner cover 510 from the elongated hole 512a.

In this way, since the air within the inner cover 510 is discharged from the multiple through holes 511a on the inner cover 510 and is caused to eventually flow into the inner cover 510 from the elongated hole 512a, generating the flow of air, the optical wheel 101 constituting the heat generating portion and the wheel motor 110 can be cooled by the flow of air. That is, the air that cools the optical wheel 101 and the like within the inner cover 510 is cooled as a result of the air flowing through the space defined between the inner cover 510 and the outer cover 520 and is then caused to flow into the inner cover 510 to cool the optical wheel 101 and the like.

Here, as described above, since the total area of the multiple through holes 511a is equal to the area of the elongated hole 512a, the amount of air that is pushed out of the multiple through holes 511a substantially coincides with the amount of air that flows into the inner cover 510 from the elongated hole 512a, whereby the flow of air can be generated with good efficiency. Additionally, since the inner cover upper plate 513 and the outer cover upper plate 523 are curved, air can be caused to flow smoothly from the optical wheel 101 towards the wheel motor 110. Further, since air flows along the flow path from the inner cover front plate 511 through the inner cover upper plate 513 to the inner cover rear plate 512 by eliminating almost the gap defined between the inner cover end plate 514 and the outer cover endplate 524, air is allowed to flow smoothly without being disturbed in any way.

Figure 8:
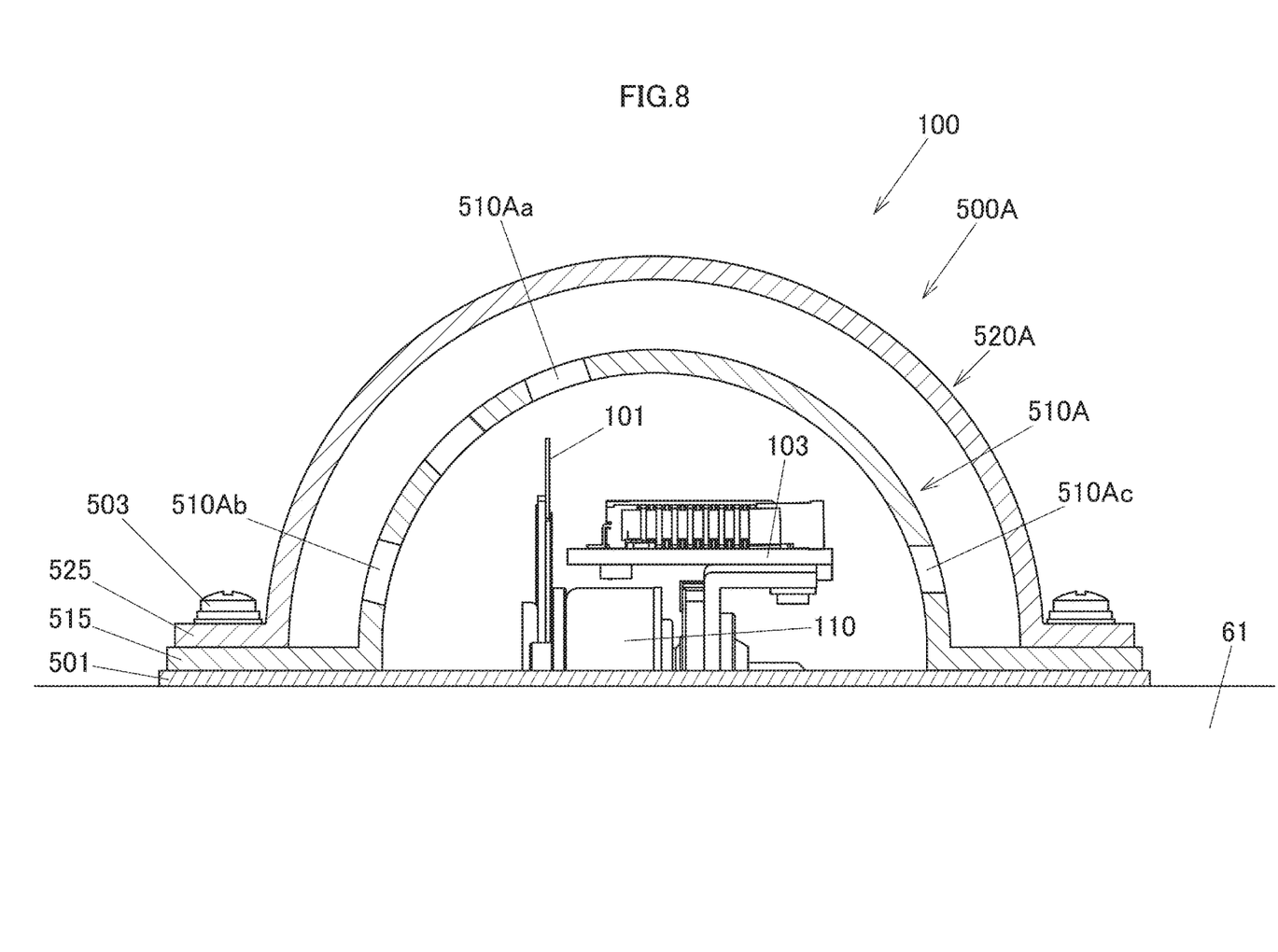
FIG. 8 is a cross-sectional view corresponding to the cross-sectional view taken along the line VI-VI in FIG. 2 with only the wheel cover illustrated in section, the cross-sectional view illustrating a modified example of a wheel cover according to the embodiment of the present invention.

In addition, FIG. 8 shows a wheel cover 500A which is a modified example made to the wheel cover 500. The wheel cover 500A is such that an inner cover 510A (a first cover) and an outer cover 520A (a second cover) are both formed into a semi-spherical shape. Multiple through holes 510Aa are formed laterally into two rows on a side of the inner cover 510A that faces the optical wheel 101, and seven through holes are formed in an upper row, while five through holes are formed in a lower row. A laterally long outlet elongated hole 510Ab is provided below the multiple through holes 511Aa. A laterally long inlet elongated hole 510Ac is formed on a side of the inner cover 510A that faces the wheel motor 110. The outlet and inlet elongated holes 510Ab, 510Ac have substantially the same area.

In this wheel cover 500A according to the modified example, too, a flow of air is generated in an interior of the wheel cover 500A. In this wheel cover 500A, a flow of air is generated over a whole area of an outer surface of the semi-spherical inner cover 510A, and similarly, a flow of air is generated over a whole area of an inner surface of the semi-spherical outer cover 520A. Consequently, there may be situations where the flow of air is interrupted on the periphery of the inlet elongated hole 510Ac of the inner cover 510A.

In the substantially box-shaped wheel cover 500 and the semi-spherical wheel cover 500A, temperature measuring tests were carried out on the wheel covers according to the embodiment (hereinafter, referred to as "with holes") and the wheel covers in which the through holes 511a, 510A are closed with tapes from inner surface side in the inner covers 510, 510A and the inlet and outlet elongated holes 510Ab, 510Ac are closed with tapes in the inner cover 510A (hereinafter, referred to as "without holes") with a thermocouple attached to a rear surface of the wheel motor 110 to verify cooling effects of the wheel covers 500, 500A. The wheel covers 500, 500A were formed to have the same internal capacity. Additionally, the inner covers 510, 510A were formed of aluminum, and the outer covers 520, 520A were formed from a resin material (polycarbonate).

| | | |
|---|---|---|
| Wheel cover 500 | With holes | 83.8 degrees |
| Wheel cover 500 | Without holes | 89.7 degrees |
| Wheel cover 500A | With holes | 85.8 degrees |
| Wheel cover 500A | Without holes | 90.1 degrees |

Thus, while the embodiment of the present invention has been described heretofore, the present invention is not limited by the embodiment and hence can be carried out while being modified as required. For example, the shape of the wheel cover (the inner cover, the outer cover) is not limited to the substantially box-like shape or the spherical shape and hence can be modified as required. However, when taking the cooling effects into consideration, as the result of the temperature measuring tests, the substantially box-shaped wheel cover 500 is preferable. The materials of the wheel cover (the inner cover, the outer cover) can be selected as required from metallic materials and resin materials. The application of the wheel covers 500, 500A is not limited to the optical wheel device 100 including the optical wheel 101 on which a luminescent material is laid out, and hence, the wheel covers 500, 500A can also be applied to an optical wheel device such as a color wheel or the like.

Thus, as has been described heretofore, according to the embodiment of the present invention, the optical wheel device 100 includes the wheel motor 110, the optical wheel 101 that is rotated by the wheel motor 110, and the wheel cover 500 or 550A that covers the optical wheel 101 partially, and the wheel covers 500, 500A include, respectively, the inner covers 510, 510A on which the multiple through holes are formed and the outer covers 520, 520A that are provided on the outer side of the inner covers 510, 510A with the predetermined gap defined between the inner covers 510, 510A and themselves.

As a result, the flow of air can be generated within the wheel covers 500, 500A, whereby air is circulated through the interior of the inner covers 510, 510A and between the inner covers 510, 510A and the outer covers 520, 520A. Consequently, the cooling efficiency of the optical wheel 101 can be enhanced. Further, since the configuration of the Helmholtz noise absorbing equipment is formed, the quietening efficiency can also be enhanced.

In addition, the multiple through holes 511a, 510Aa are formed on the side facing the optical wheel 101. Consequently, the rotational noise of the optical wheel 101, which is considered to constitute the noise source, can be propagated directly to the multiple through holes 511a, 510Aa, and air within the multiple through holes 511a, 510Aa can be vibrated greatly, whereby a great flow of air can be generated within the wheel covers 500, 500A.

The elongated holes 512a, 510Ac are formed on the sides of the inner covers 510, 510A that face the inner wheel motor 110. As a result, air pushed out from the sides of the inner covers 510, 510A that face the optical wheel 101 is allowed to flow into the inner covers 510, 510A via the elongated holes 512a, 510Ac.

In the inner cover 510, the multiple through holes 511a and the elongated hole 512a have the same area. As a result, since the amount of air that is pushed out of the interior of the inner cover 510 via the multiple through holes 511a becomes substantially the same as the amount of air that flows into the inner cover 510 from the elongated hole 512a, air is allowed to flow smoothly.

The inner cover 510 is formed of the inner cover front plate 511, the inner cover rear plate 512, the convex arc-like inner cover upper plate 513, and the two inner cover end plates 514. As a result, since the inner cover front plate 511 can be erected substantially parallel to the optical wheel 101, and the multiple through holes 511a can be provided thereon, noise from the optical wheel 101 can be absorbed with good efficiency. Then, air is allowed to flow smoothly along the convex arc-like inner cover upper plate 513 from the outer surface of the inner cover front plate 511 to the inner cover rear plate 512.

The outer cover 520 is formed of the outer cover front plate 521, the outer cover rear plate 522, the convex arc-like outer cover upper plate 523, and the two outer cover end plates 524, which lie opposite to the inner cover front plate 511, the inner cover rear plate 512, and the inner cover upper plate 513 of the inner cover 510, respectively, with the predetermined gap defined therebetween. As a result, air flows smoothly along the inner surfaces of the outer cover front plate 521, the outer cover rear plate 522, and the convex arc-like outer cover upper plate 523 to thereby enhance the cooling efficiency.

The inner cover 510A and the outer cover 520A are both formed into the semi-spherical shape. As a result, the semi-spherical wheel cover 500A can be formed in which air flows smoothly, and the rotational noise of the optical wheel 101 is quietened.

The light source unit 60 includes the optical wheel device 100 including the optical wheel 101 which includes the wheel cover 500 or 500A and on which a luminescent light emitting area is laid out and the excitation light shining device 70 including the plurality of blue laser diodes 71, which are semiconductor light emitting elements that emit light in the blue wavelength range that differs from light in the green wavelength range emitted from the optical wheel device 100. As a result, the light source unit 60 can be provided in which not only is the cooling efficiency of the optical wheel device 100 enhanced, but also the rotational noise of the optical wheel 101 is quietened.

The projector 10 includes the light source unit 60, the display device 51, the projection optical system 220, and the projector control unit. As a result, the projector 10 can be provided in which not only is the cooling efficiency of the optical wheel device 100 enhanced, but also the rotational noise of the optical wheel 101 is quietened.

In the embodiment and the modified example that have been described heretofore, the wheel motor 110 and the optical wheel 101 that is rotated by the wheel motor 110 and on which the luminescent light emitting area that emits luminescent light in the green wavelength range that differs from light in the blue wavelength range (light in the first wavelength range) and light in the red wavelength range (light in the second wavelength range) is laid out are described as constituting the heat generating portion. However, the present invention is not limited to this configuration. For example, the heat generating portion may be the other light sources such as the blue laser diodes 71, which are semiconductor light emitting elements, the red light source 121 (the red light emitting diode), which is the semiconductor light emitting device, and the like. Alternatively, the heat generating portion may be a heat dissipating plate or fin for the light source such as the blue laser diodes 71 or the red light source 121.

The height from the lower ends of the inner covers 510, 510A (the first cover) to the opening center of the multiple through holes 511a, 510Aa (the first opening portion) is greater than the height from the lower ends of the inner covers 510, 510A (the first cover) to the opening center of the elongated hole 512a (the second opening). As a result, a gas in an area where the temperature is relatively high in the interior of the first cover is discharged to the outside of the inner covers 510, 510A (the first cover) with good efficiency, so that the gas so discharged flows through the flow path defined between the inner covers 510, 510A (the first cover) and the outer covers 520, 520A (the second cover) into the inlet hole, whereby the heat generating portion can be cooled with good efficiency.

The total cross-sectional area of the multiple through holes 511a, 510Aa (the first opening portion) that are formed on the sides of the inner covers 510, 510A (the first cover) that face the optical wheel 101 is equal to or greater than the cross-sectional areas of the elongated holes 512a, 510Ac (the second opening portion) that are formed on the sides of the inner covers 510, 510A (the first cover) that face the wheel motor 110. As a result, since the heat in the interior of the first cover is discharged from the first opening portion to the outside of the first cover and is guided to the second opening portion through the flow path defined between the first cover and the second cover for circulation, the heat generating portion can be cooled with good efficiency.

A cross-sectional area of the flow path defined between the inner covers 510, 510A (the first cover) and the outer covers 520, 520A (the second cover) is equal to or greater than the cross-sectional areas of the through holes 511a, 510Aa (the first opening portion). As a result, since the flow path resistance can be made small, the gas is allowed to circulate with good efficiency.

It is desirable that the total cross-sectional area of the multiple through holes 511a, 510Aa (the first opening portion), the cross-sectional areas of the elongated holes 512a, 510Ac (the second opening portion), and the cross-sectional area of the flow path substantially coincide with one another. Adopting this configuration can solve a problem that the gas is prevented from flowing smoothly to thereby become stagnant caused by the cross-sectional area of the flow path becoming much greater than the cross-sectional area of the first opening portion or a problem that the flow path resistance is increased caused by the cross-sectional area of the flow path becoming much smaller than the cross-sectional area of the first opening portion.

The outer cover end plate 524 (the second side plate) and the inner cover end plate 514 (the first side plate) do not need to lie close to each other with the predetermined space defined therebetween. The outer cover end plate 524 (the second side plate) and the inner cover end plate 514 (the first side plate) may be disposed in such a manner as to tightly contact each other. By adopting this configuration, since no gas flows between the outer cover endplate 524 (the second side plate) and the inner cover end plate 514 (the first side plate), much more gas is caused to flow between the inner cover upper plate 513 (the first upper plate) and the outer cover upper plate 523 (the second upper plate), whereby the cooling efficiency can be enhanced.

While the embodiment and its modified example of the present invention have been described heretofore, the embodiment and its modified example are presented as examples, and hence, there is no intention to limit the scope of the present invention by the embodiment and its modified example. These novel embodiment and modified example can be carried out in other various forms, and various omissions, replacements and modifications can be made to them without departing from the spirit and scope of the present invention. Those resulting embodiments and their modifications are included in the spirit and scope of the present invention and are also included in the scope of inventions claimed for patent under claims below and their equivalents.

What is claimed is:

1. A heat generating device, comprising:
   a heat generating portion;
   a first cover configured to cover at least part of the heat generating portion and including a first opening portion formed on one side and a second opening portion formed on the other side lying opposite to the one side; and
   a second cover disposed on an outer side of the first cover and forming a flow path leading from the first opening portion to the second opening portion,
   wherein a height from a lower end of the first cover to an opening center of the first opening portion is greater than a height from the lower end of the first cover to an opening center of the second opening portion,
   wherein a cross-sectional area of the first opening portion is equal to or greater than a cross-sectional area of the second opening portion, and wherein a cross-sectional area of the flow path is equal to or greater than a cross-sectional area of the first opening portion.

2. The heat generating device according to claim 1, wherein the heat generating portion is disposed at the one side in an interior of the first cover.

3. The heat generating device according to claim 2, wherein the first opening portion is made up of multiple through holes, and the second opening portion constitutes an elongated hole.

4. The heat generating device according to claim 1, wherein the first opening portion is made up of multiple through holes, and the second opening portion constitutes an elongated hole.

5. The heat generating device according to claim 1, wherein at least part of the first cover and at least part of the second cover are formed into a convex arc-like shape in a side view.

6. The heat generating device according to claim 5, wherein the first cover comprises a first front plate erected at a side facing the heat generating portion and including the multiple through holes formed thereon, a first rear plate erected in a position lying opposite to the first front plate, a first upper plate formed to have the convex arc-like shape so as to connect upper ends of the first front plate and the first second plate together, and two first end plates configured not only to connect both ends of the first front plate and both ends of the first rear plate together but also to connect to the first upper plate at upper ends thereof.

7. The heat generating device according to claim 6, wherein the second cover comprises a second front plate erected with a predetermined gap defined between the first front plate and itself, a second rear plate erected with a predetermined gap defined between the first rear plate and itself, a second upper plate of the convex arc-like shape elected with a predetermined gap defined between the first upper plate and itself and formed so as to connect upper ends of the second front plate and the second rear plate together, and two second end plates elected close to the first end plates and configured not only to connect the second front plate and the second rear plate together at both ends of the second front plate and the second rear plate but also to connect to the second upper plate at upper ends of the two second end plates.

8. The heat generating device according to claim 5, wherein the first cover and the second cover are both formed into a semi-spherical shape.

9. A light source unit, comprising:
the heat generating device according to claim 1;
an excitation light shining device configured to emit light in a first wavelength range; and
a semiconductor light emitting device configured to emit light in a second wavelength range that differs from the light in the first wavelength range,
wherein the heat generating portion comprises:
a wheel motor; and
an optical wheel configured to be rotated by the wheel motor and comprising a luminescent light emitting area laid out on the optical wheel to emit luminescent light in a third wavelength range that differs from the light in the first wavelength range and the light in the second wavelength range.

10. A projector, comprising:
the light source unit according to claim 9;
a display device onto which light emitted from the light source unit is shined to form image light;
a projection optical system configured to project the image light formed by the display device onto a screen; and
a control unit configured to control the display device and the light source unit.

11. A heat generating device, comprising:
a heat generating portion;
a first cover configured to cover at least part of the heat generating portion and including a first opening portion formed on one side and a second opening portion formed on the other side lying opposite to the one side; and
a second cover disposed on an outer side of the first cover and forming a flow path leading from the first opening portion to the second opening portion,
wherein a height from a lower end of the first cover to an opening center of the first opening portion is greater than a height from the lower end of the first cover to an opening center of the second opening portion,
wherein the heat generating portion is disposed at the one side in an interior of the first cover.

12. The heat generating device according to claim 11, wherein the first opening portion is made up of multiple through holes, and the second opening portion constitutes an elongated hole.

13. A heat generating device, comprising:
a heat generating portion;
a first cover configured to cover at least part of the heat generating portion and including
a first opening portion formed on one side and a second opening portion formed on the other side lying opposite to the one side; and
a second cover disposed on an outer side of the first cover and forming a flow path leading from the first opening portion to the second opening portion,
wherein a height from a lower end of the first cover to an opening center of the first opening portion is greater than a height from the lower end of the first cover to an opening center of the second opening portion,
wherein at least part of the first cover and at least part of the second cover are formed into a convex arc-like shape in a side view, and
wherein the first cover comprises a first front plate erected at a side facing the heat generating portion and including the multiple through holes formed thereon, a first rear plate erected in a position lying opposite to the first front plate, a first upper plate formed to have the convex arc-like shape so as to connect upper ends of the first front plate and the first second plate together, and two first end plates configured not only to connect both ends of the first front plate and both ends of the first rear plate together but also to connect to the first upper plate at upper ends thereof.

14. The heat generating device according to claim 13, wherein the second cover comprises a second front plate erected with a predetermined gap defined between the first front plate and itself, a second rear plate erected with a predetermined gap defined between the first rear plate and itself, a second upper plate of the convex arc-like shape elected with a predetermined gap defined between the first upper plate and itself and formed so as to connect upper ends of the second front plate and the second rear plate together, and two second end plates elected close to the first end plates and configured not only to connect the second front plate and the second rear plate together at both ends of the second front plate and the second rear plate but also to connect to the second upper plate at upper ends of the two second end plates.

15. The heat generating device according to claim 13, wherein the first cover and the second cover are both formed into a semi-spherical shape.

16. A light source unit, comprising:
a heat generating device which comprises:
a heat generating portion;
a first cover configured to cover at least part of the heat generating portion and including a first opening portion formed on one side and a second opening portion formed on the other side lying opposite to the one side; and
a second cover disposed on an outer side of the first cover and forming a flow path leading from the first opening portion to the second opening portion,
wherein a height from a lower end of the first cover to an opening center of the first opening portion is greater than a height from the lower end of the first cover to an opening center of the second opening portion,
an excitation light shining device configured to emit light in a first wavelength range; and
a semiconductor light emitting device configured to emit light in a second wavelength range that differs from the light in the first wavelength range,
wherein the heat generating portion comprises:
a wheel motor; and
an optical wheel configured to be rotated by the wheel motor and comprising a luminescent light emitting area laid out on the optical wheel to emit luminescent light in a third wavelength range that differs from the light in the first wavelength range and the light in the second wavelength range.

17. A projector, comprising:
the light source unit according to claim 16;
a display device onto which light emitted from the light source unit is shined to form image light;
a projection optical system configured to project the image light formed by the display device onto a screen; and
a control unit configured to control the display device and the light source unit.

\* \* \* \* \*

UNITED STATES PATENT AND TRADEMARK OFFICE
CERTIFICATE OF CORRECTION

| | |
|---|---|
| PATENT NO. | : 11,003,063 B2 |
| APPLICATION NO. | : 16/717626 |
| DATED | : May 11, 2021 |
| INVENTOR(S) | : Inoue |

It is certified that error appears in the above-identified patent and that said Letters Patent is hereby corrected as shown below:

In the Claims

Claim 6, Column 15, Line 27, delete "second" and insert -- rear --

Claim 13, Column 16, Line 51, delete "second" and insert -- rear --

Signed and Sealed this
Tenth Day of May, 2022

Katherine Kelly Vidal
*Director of the United States Patent and Trademark Office*